(12) United States Patent
Lee et al.

(10) Patent No.: US 9,785,736 B2
(45) Date of Patent: Oct. 10, 2017

(54) CONNECTIVITY-AWARE LAYOUT DATA REDUCTION FOR DESIGN VERIFICATION

(71) Applicant: Mentor Graphics Corporation, Wilsonville, OR (US)

(72) Inventors: Yi-Ting Lee, Zhubei (TW); Sridhar Srinivasan, Tualatin, OR (US); Hung-Hsu Feng, Camas, WA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/663,275

(22) Filed: Mar. 19, 2015

(65) Prior Publication Data
US 2016/0063172 A1 Mar. 3, 2016

Related U.S. Application Data

(60) Provisional application No. 62/045,002, filed on Sep. 3, 2014.

(51) Int. Cl.
*G06F 17/50* (2006.01)
(52) U.S. Cl.
CPC ...... *G06F 17/5081* (2013.01); *G06F 2217/70* (2013.01)
(58) Field of Classification Search
USPC ...................................................... 716/109
See application file for complete search history.

(56) References Cited

U.S. PATENT DOCUMENTS

| | | | | |
|---|---|---|---|---|
| 5,984,510 A | * | 11/1999 | Guruswamy | G06F 17/5068 716/104 |
| 6,725,439 B1 | * | 4/2004 | Homsinger | G06F 17/5045 716/115 |
| 2002/0144213 A1 | * | 10/2002 | Ramaswamy | G06F 17/5081 716/112 |
| 2008/0148199 A1 | * | 6/2008 | Bell | G06F 17/5036 716/112 |
| 2009/0094568 A1 | * | 4/2009 | Shukla | G06F 17/5081 716/106 |

OTHER PUBLICATIONS

ESD Association Technical Report, ESD TR18.0-01-11, 2011.

* cited by examiner

*Primary Examiner* — Mohammed Alam
(74) *Attorney, Agent, or Firm* — Banner & Witcoff, Ltd.

(57) ABSTRACT

Aspects of the disclosed technology relate to techniques of connectivity-aware reduction of layout data. With various implementations of the disclosed technology, circuit elements of interest are selected in a circuit design which includes netlist information and layout data. Based at least on pins for the circuit elements of interest, the circuit elements of interest, or both, nets of interest are determined. Cells of interest, comprising cells that are identified based at least on pins for the circuit elements of interest, the circuit elements of interest, or both, are then determined. Based on the nets of interest and the cells of interest, layout geometric elements are selected and may be analyzed for design verification. For electrostatic discharge (ESD) protection verification, the cells of interest may further comprise cells that include portions of power supply grids on top metal layers.

19 Claims, 7 Drawing Sheets

Flow chart
400

CONNECTIVITY-AWARE LAYOUT DATA REDUCTION FOR DESIGN VERIFICATION

RELATED APPLICATIONS

This application claims the benefit of U.S. Provisional Patent Application No. 62/045,002, filed on Sep. 3, 2014, and naming Yi-Ting Lee et al. as inventors, which application is incorporated entirely herein by reference.

FIELD OF THE DISCLOSED TECHNOLOGY

The present disclosed technology relates to the field of circuit design verification. Various implementations of the disclosed technology may be particularly useful for reducing layout data for design verification.

BACKGROUND OF THE DISCLOSED TECHNOLOGY

Electronic circuits, such as integrated circuits (ICs), are used in a variety of products, from automobiles to microwaves to personal computers. Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, such as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Circuit layout descriptions can be provided in many different formats. The Graphic Data System II (GDSII) format is a popular format for transferring and archiving two-dimensional (2D) graphical circuit layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in design layouts that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask must be created to expose only the desired areas to the radiation, and to protect the other areas from exposure. The mask is created from circuit layout data. That is, the geometric elements described in a design layout define the relative locations or areas of the circuit that will be exposed to radiation through the mask. A mask or reticle writing tool is used to create the mask based upon the design layout, after which the mask can be used in a photolithographic process.

The design of a new integrated circuit may include the interconnection of millions of transistors, resistors, capacitors, or other electrical structures into logic circuits, memory circuits, programmable field arrays, and other circuit devices. In order to allow a computer to more easily create and analyze these large data structures (and to allow human users to better understand these data structures), they are often hierarchically organized into smaller data structures, typically referred to as "cells." For example, all of the transistors making up a memory circuit for storing a single bit may be categorized into a single "bit memory" cell. Rather than having to enumerate each transistor individually, the group of transistors making up a single-bit memory circuit can thus collectively be referred to and manipulated as a single unit. Similarly, the design data describing a larger 16-bit memory register circuit can be categorized into a single cell. This higher level "register cell" might then include sixteen bit memory cells, together with the design data describing other miscellaneous circuitry, such as an input/output circuit for transferring data into and out of each of the bit memory cells. Similarly, the design data describing a 128 kB memory array can then be concisely described as a combination of only 64,000 register cells, together with the design data describing its own miscellaneous circuitry, such as an input/output circuit for transferring data into and out of each of the register cells. Of course, while the above-described example is of design data organized hierarchically based upon circuit structures, circuit design data may alternately or additionally be organized hierarchically according to any desired criteria including, for example, a geographic grid of regular or arbitrary dimensions (e.g., windows), a memory amount available for performing operations on the design data, design element density, etc.

By categorizing microcircuit design data into hierarchical cells, large data structures can be processed more quickly and efficiently. For example, a circuit designer typically will analyze a design to ensure that each circuit feature described in the design complies with design rules specified by the foundry that will manufacture microcircuits from the design. With the above example, instead of having to analyze each feature in the entire 128 kB memory array, a design rule check process can analyze the features in a single bit cell. The results of the check will then be applicable to all of the single bit cells. Once it has confirmed that one instance of the single bit cells complies with the design rules, the design rule check process then can complete the analysis of a register cell simply by analyzing the features of its additional miscellaneous circuitry (which may itself be made of up one or more hierarchical cells). The results of this check will then be applicable to all of the register cells. Once it has confirmed that one instance of the register cells complies with the design rules, the design rule check software application can complete the analysis of the entire 128 kB memory array simply by analyzing the features of the additional miscellaneous circuitry in the memory array. Thus, the analysis of a large data structure can be compressed into the analyses of a relatively small number of cells making up the data structure.

A particular type of design verification is the verification of electrostatic discharge (ESD) protection. An ESD event may result in a current pulse from few hundred milliamps to several tens of amps to the IC for a time period ranging from few nanoseconds to several microseconds. Typical power levels that need to be dissipated during an ESD event are in the order of several tens of watts. An ESD protection circuit can be used to shunt the ESD current through the unpowered IC along the intended ESD protection path as designed by the ESD engineer, while clamping the voltage at a safe level. As such, no IC functional performance degradation will occur.

Various conventional ESD protection approaches and ESD protection verification techniques are discussed in the ESD Association Technical Report, ESD TR18.0-01-11, 2011, which is incorporated herein by reference. According to the report, a crucial step for the application of the EDA verification tools is the extraction and reduction of a netlist. The netlist can be gained both from source schematics and from layout data. In the latter case it is possible to extract parasitic elements resulting from wiring and vicinity effects, which are very important for ESD. Depending on the size of the circuit block and the granularity of the parasitic elements such a back-annotated netlist can easily reach a file size of several 10's of GB, which is very difficult to handle even for today's hardware and slows down the run time extremely. In general the overwhelming number of circuit elements is irrelevant for the ESD evaluation which gives the chance to reduce the netlist. It is thus desirable to explore ways that can reduce the netlist and its associated layout data without neglecting the few critical elements like receiving gates at power domain crossings.

BRIEF SUMMARY OF THE DISCLOSED TECHNOLOGY

Aspects of the disclosed technology relate to techniques of connectivity-aware reduction of layout data. In one aspect, there is a method comprising: identifying circuit elements of interest in a circuit design, wherein the circuit design includes netlist information and layout data; determining nets of interest based at least on pins for the circuit elements of interest, the circuit elements of interest, or both; determining cells of interest, wherein the cells of interest comprise cells that are identified based at least on pins for the circuit elements of interest, the circuit elements of interest, or both; and selecting layout geometric elements based on the nets of interest and the cells of interest. The method may further comprise performing a verification operation on the circuit design based on the layout geometric elements.

The netlist information may be extracted from the layout data. The selecting may comprise determining a connectivity model for the geometric elements. The selecting may keep hierarchy of the cells of interest.

According to some embodiments of the disclosed technology, the circuit elements of interest comprise ESD (electrostatic discharge) protection elements, I/O pads, and power supply pads. The cells of interest may further comprise cells that include portions of power supply grids on top metal layers.

In another aspect, there are one or more non-transitory processor-readable media storing processor-executable instructions for causing one or more processors to perform a method, the method comprising: identifying circuit elements of interest in a circuit design, wherein the circuit design includes netlist information and layout data; determining nets of interest based at least on pins for the circuit elements of interest, the circuit elements of interest, or both; determining cells of interest, wherein the cells of interest comprise cells that are identified based at least on pins for the circuit elements of interest, the circuit elements of interest, or both; and selecting layout geometric elements based on the nets of interest and the cells of interest. The method may further comprise performing a verification operation on the circuit design based on the layout geometric elements.

In still another aspect, there is a system, comprising: a circuit elements of interest identification unit configured to identify circuit elements of interest in a circuit design, wherein the circuit design includes netlist information and layout data; a nets of interest determination unit configured to determine nets of interest based at least on pins for the circuit elements of interest, the circuit elements of interest, or both; a cells of interest determination unit 360 configured to determine cells of interest, wherein the cells of interest comprise cells that include the circuit elements of interest; and a layout geometric elements selection unit configured to select layout geometric elements based on the nets of interest and the cells of interest. The system may further comprise a design verification unit configured to perform a verification operation on the circuit design based on the layout geometric elements.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the present disclosed technology relate to techniques of connectivity-aware reduction of layout data. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine", "identify" and "select" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of concurrently running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

Figure 1:
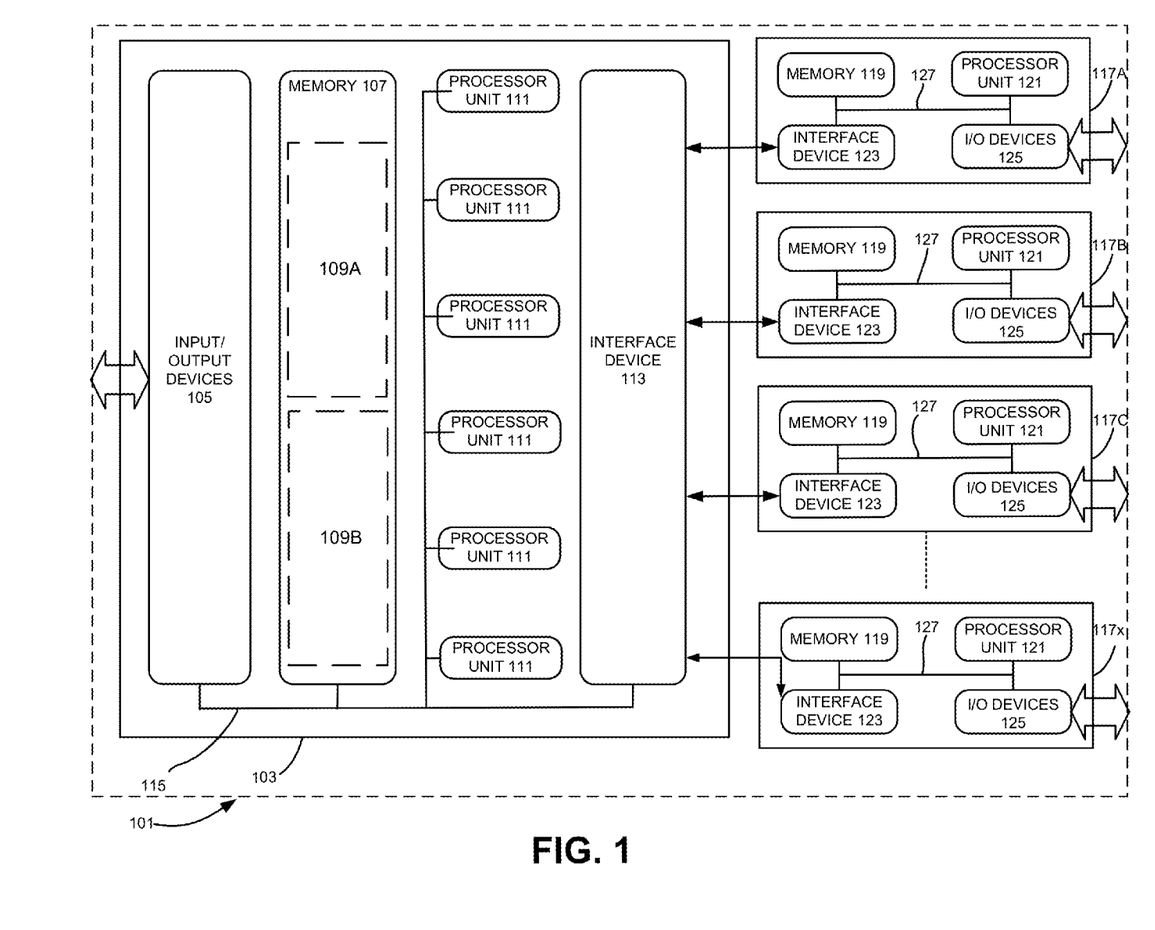
FIG. 1 illustrates an example of a computing system that may be used to implement various embodiments of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
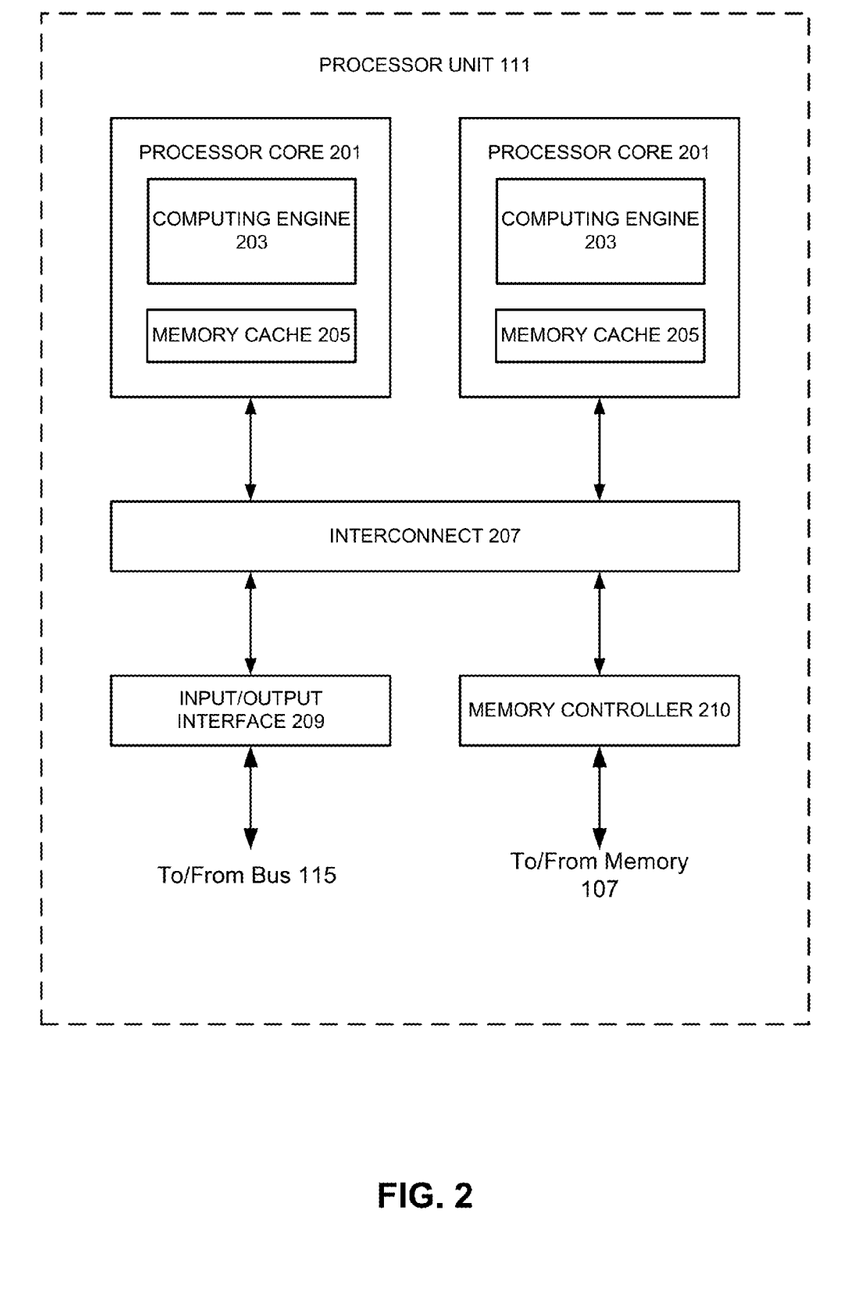
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Connectivity-Aware Layout Data Reduction Tools and Methods

Figure 3:
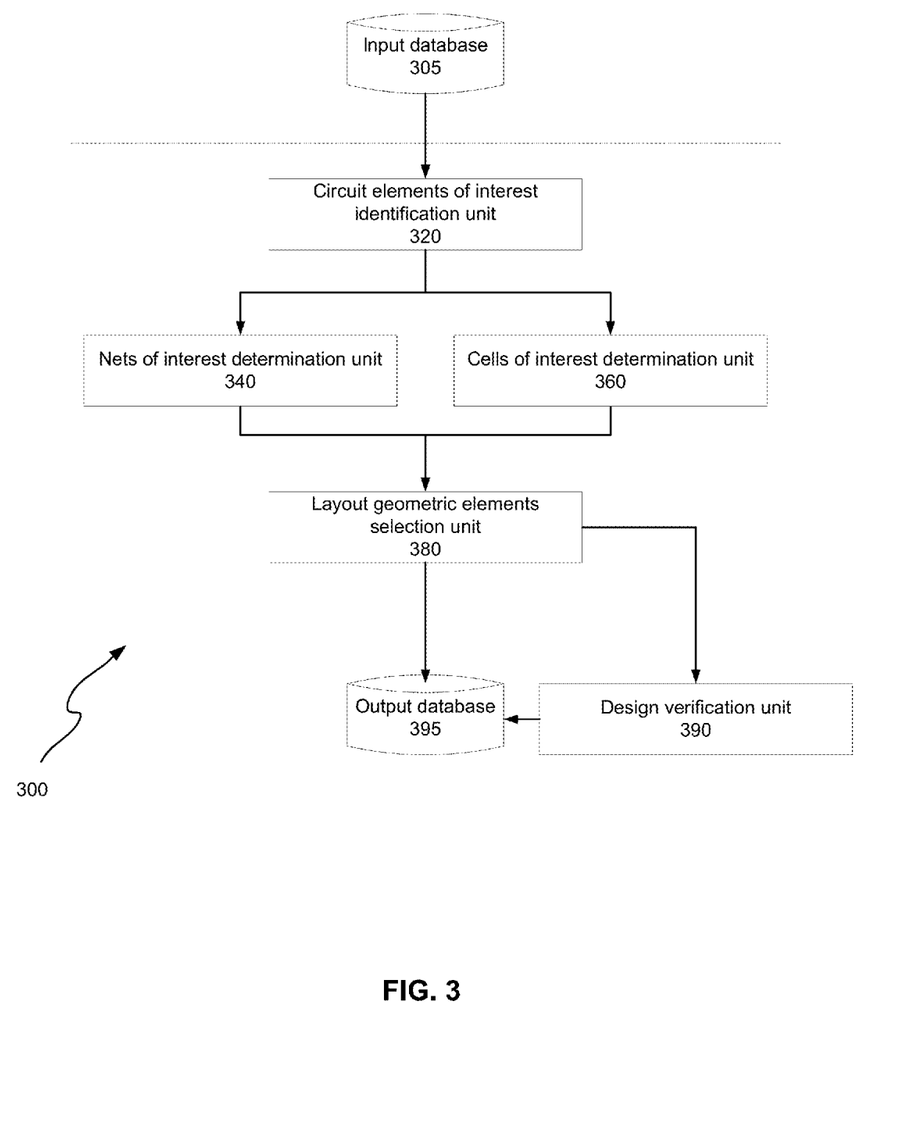
FIG. 3 illustrates an example of a connectivity-aware layout data reduction tool according to various embodiments of the disclosed technology.

FIG. 3 illustrates an example of a connectivity-aware layout data reduction tool according to various embodiments of the disclosed technology. As seen in the figure, the connectivity-aware layout data reduction tool 300 includes four units: a circuit elements of interest identification unit 320, a nets of interest determination unit 340, a cells of interest determination unit 360 and a layout geometric elements selection unit 380. Some implementations of the connectivity-aware layout data reduction tool 300 may cooperate with (or incorporate) one or more of an input database 305, an output database 395, and a design verification unit 390.

As will be discussed in more detail below, the circuit elements of interest identification unit 320 identifies circuit elements of interest in a circuit design, wherein the circuit design includes netlist information and layout data. Based at least on pins for the circuit elements of interest, the circuit elements of interest, or both, the nets of interest determination unit 340 determines nets of interest. The cells of interest determination unit 360 determines cells of interest, wherein the cells of interest comprise cells that include the circuit elements of interest. Based on the nets of interest and the cells of interest, the layout geometric elements selection unit 380 selects layout geometric elements. The circuit design may be received from the input database 305 and the selected layout geometric elements may be stored in the output database. Based on the layout geometric elements, the design verification unit 390 may perform a verification operation on the circuit design.

As previously noted, various examples of the disclosed technology may be implemented by a multiprocessor computing system, such as the computing system illustrated in FIGS. 1 and 2. Accordingly, one or more of the circuit elements of interest identification unit 320, the nets of interest determination unit 340, the cells of interest determination unit 360, the layout geometric elements selection unit 380 and the design verification unit 390 may be implemented by executing programming instructions on one or more processors in a computing system such as the computing system illustrated in FIG. 1 and FIG. 2. Correspondingly, some other embodiments of the disclosed technology may be implemented by software instructions, stored on a non-transitory computer-readable medium, for instructing one or more programmable computers/computer systems to perform the functions of one or more of the circuit elements of interest identification unit 320, the nets of interest determination unit 340, the cells of interest determination unit 360, the layout geometric elements selection unit 380 and the design verification unit 390. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

It also should be appreciated that, while the circuit elements of interest identification unit 320, the nets of interest determination unit 340, the cells of interest determination unit 360, the layout geometric elements selection unit 380 and the design verification unit 390 are shown as separate units in FIG. 3, a single servant computer (or a single processor within a master computer) may be used to implement two or more of these units at different times, or components of two or more of these units at different times.

With various examples of the disclosed technology, the input database 305 and the output database 395 may be implemented using any suitable computer readable storage device. That is, either of the input database 305 and the output database 395 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 305 and the output database 395 are shown as separate units in FIG. 3, a single data storage medium may be used to implement some or all of these databases.

Figure 4:
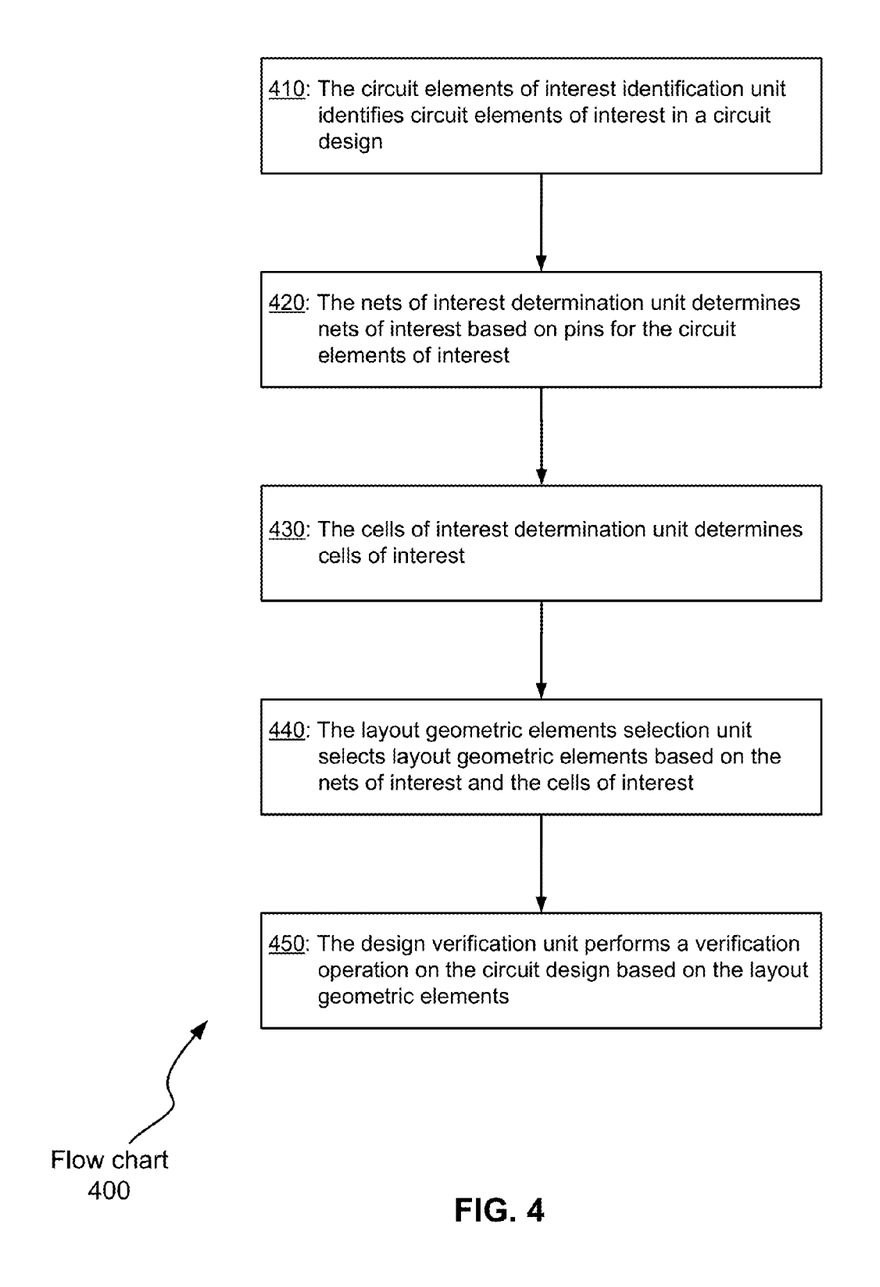
FIG. 4 illustrates a flowchart showing a process for reducing layout data for verification that may be implemented according to various examples of the disclosed technology.

FIG. 4 illustrates a flowchart showing a process for reducing layout data for verification that may be implemented according to various examples of the disclosed technology. For ease of understanding, methods for reducing layout data for verification that may be employed according to various embodiments of the disclosed technology will be described with reference to the connectivity-aware layout data reduction tool 300 illustrated in FIG. 3 and the flow chart 400 in FIG. 4. It should be appreciated, however, that alternate implementations of a connectivity-aware layout data reduction tool may be used to perform the method for reducing layout data for verification in the flow chart 400 according to various embodiments of the disclosed technology. In addition, it should be appreciated that implementations of the connectivity-aware layout data reduction tool 300 may be employed to implement methods for reducing layout data according to different embodiments of the disclosed technology other than the one illustrated by the flow chart 400 in FIG. 4.

Initially, in operation 410 of the flow chart 400, the circuit elements of interest identification unit 320 identifies circuit elements of interest in a circuit design. The circuit design includes netlist information and layout data. Circuit elements included the netlist information are associated with corresponding geometric elements included the layout data. The netlist information may be extracted from the layout data. The circuit elements of interest identification unit 320 may employ a commercial electronic design automation tool to conduct the identification operation. An example of such an electronic design automation tool is the Calibre® PERC software tool available from Mentor Graphics Corporation of Wilsonville, Oreg.

Figure 5:
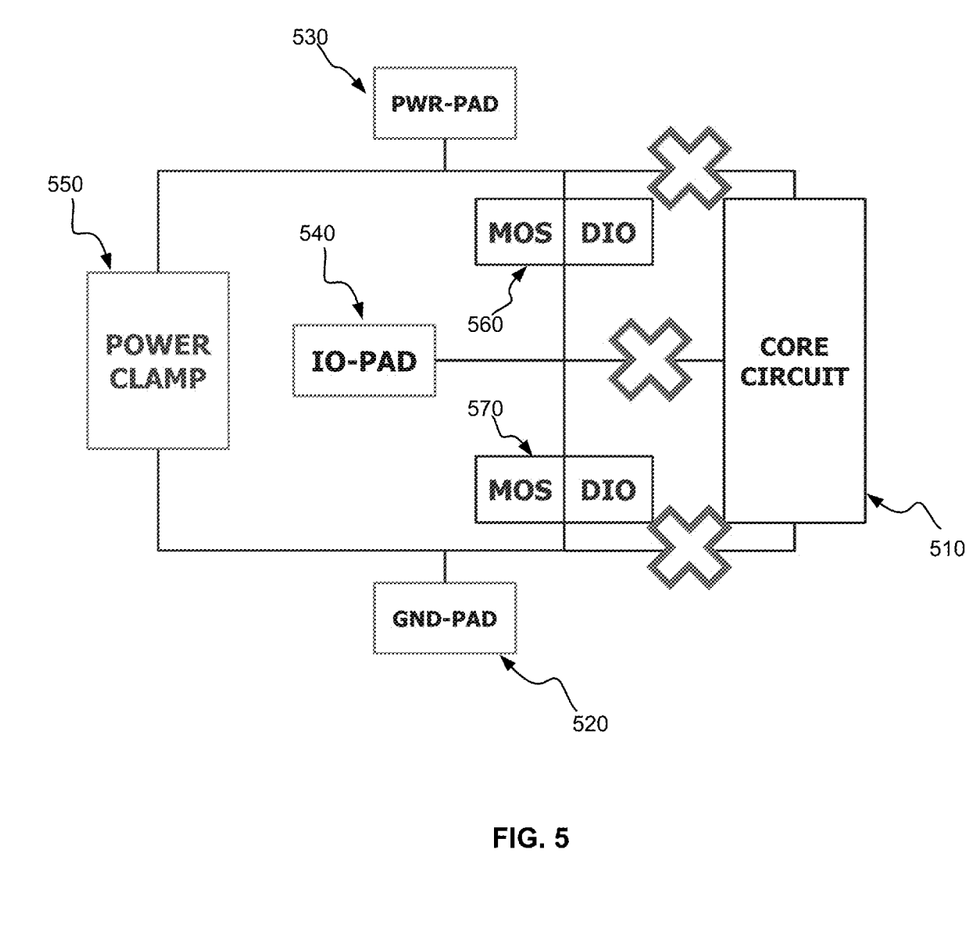
FIG. 5 illustrates an example of ESD protection circuitry.

FIG. 5 illustrates an example of ESD protection circuitry. For the ESD protection verification, the circuit elements of interest comprise ESD protection elements, I/O pads and power supply pads. In the figure, the ESD protection circuit elements include power supply pads 520 (ground) and 530 (power), an I/O pad 540, and ESD protection elements 550, 560 and 570. Both negative and positive electrostatic discharge pulses are shunted to the power supply pads 530 and 520 through the ESD protection elements 560 and 570, respectively. The ESD protection element 550 serves as a power rail clamp, providing a further discharge path between the power supply pads 520 and 530. If the ESD protection circuitry functions properly, the core circuit 510 will not be affected by an otherwise harmful electrostatic discharge. The Calibre® PERC software tool has the capability to identify ESD protection elements in a circuit design like those shown in FIG. 5.

Figure 6A:
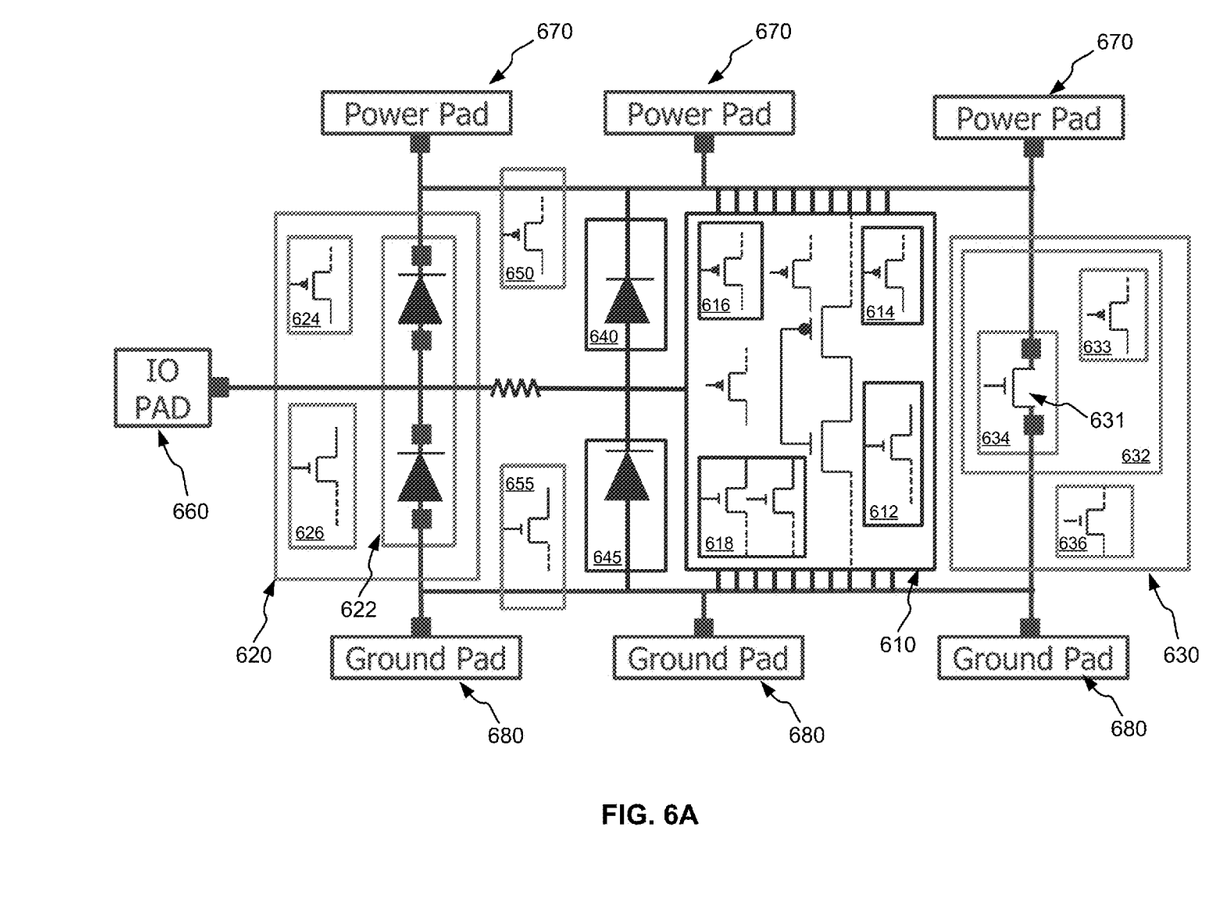
FIG. 6A illustrates an example of ESD protection circuitry represented in a hierarchical form.

FIG. 6A illustrates another example of ESD protection circuitry. This ESD protection circuitry and the protected circuit are both represented in a hierarchical form. For example, the protected circuit is a cell 610. The cell 610 comprises cells 612, 614, 616 and 618. Similarly, the ESD protection circuitry comprises cells 620, 630, 640 and 645. Among them, cell 620 comprises cells 622, 624 and 626, and cell 630 comprises cells 632 and 636. The cell 632 also comprises cells 633 and 634. With various implementations of the disclosed technology, the hierarchical form may be preserved during the process for reducing layout data.

For some circuit verification applications, the circuit elements of interest in FIG. 6A may comprise power supply pads 680 (ground) and 670 (power), an I/O pad 660, and ESD protection circuit elements inside cells 622 and 634. The cells 640 and 645, secondary ESD protection devices, may be included in the circuit elements of interest along with the above primary ESD protection devices or selected alone for some other circuit verification applications.

Next, in operation 420, the nets of interest determination unit 340 determines nets of interest based at least on pins for the circuit elements of interest, the circuit elements of interest, or both. In the example shown in FIG. 5, the pins for the I/O pad 540 and the power supply pads 520 and 530 are themselves. Each of the ESD protection elements 550, 560 and 570 has at least two pins, coupled to either the I/O pad 540 or one of the power supply pads 520/530. Depending on the ESD protection circuitry, an ESD protection element may have more than two pins. In FIG. 6A, the pins for the circuit elements of interest are represented by small solid squares.

A pin from an ESD protection element and its coupled pin (the I/O pad or power supply pad) forms pin pair. From these pin-pairs, for example, the nets of interest can be readily determined. This greatly reduces the number of nets for conducting verification. With various implementations of the disclosed technology, the connectivity between the pin pairs will be preserved during the whole process for reducing layout data for verification. This may be achieved at least through "based at least on" and "based on" in some of the operations of the process.

In operation 430, the cells of interest determination unit 360 determines cells of interest. The cells of interest comprise cells that are identified based at least on the pins for the circuit elements of interest, the circuit elements of interest, or both. For example, the device path for a pin from a TOP cell is described as X48/X24/D0:POS. The cells of interest determination unit 360 selects the cells in the cone of influence of the device path, TOP, CELL_X48 and CELL_X24. In the case of the ESD protection verification, the cells of interest may further comprise cells that include portions of power supply grids on top metal layers.

In the example illustrated in FIG. 6A, cells 634, 632 and 630 are the bottom level, middle level and top level cells for an ESD protection circuit element 631, respectively, and are thus included in the cells of interest. Cells 632, 633 and 636, in the cone of influence, are also included in the cells of interest. Similarly, the cells of interest include cells 620, 622, 624, and 626. Cells 650 and 655, representing cells that include portions of power supply grids on top metal layers, may also be identified and included in the cells of interest.

In operation 440, the layout geometric elements selection unit 380 selects layout geometric elements based on the nets of interest and the cells of interest. If the layout data reduction process is performed for the ESD protection verification, I/O net geometric elements in connect layers and power supply geometric elements from the selected cells will be selected according to various implementations of the disclosed technology. The selecting may comprise determining a connectivity model for the selected geometric elements based on original connectivity information.

Figure 6B:
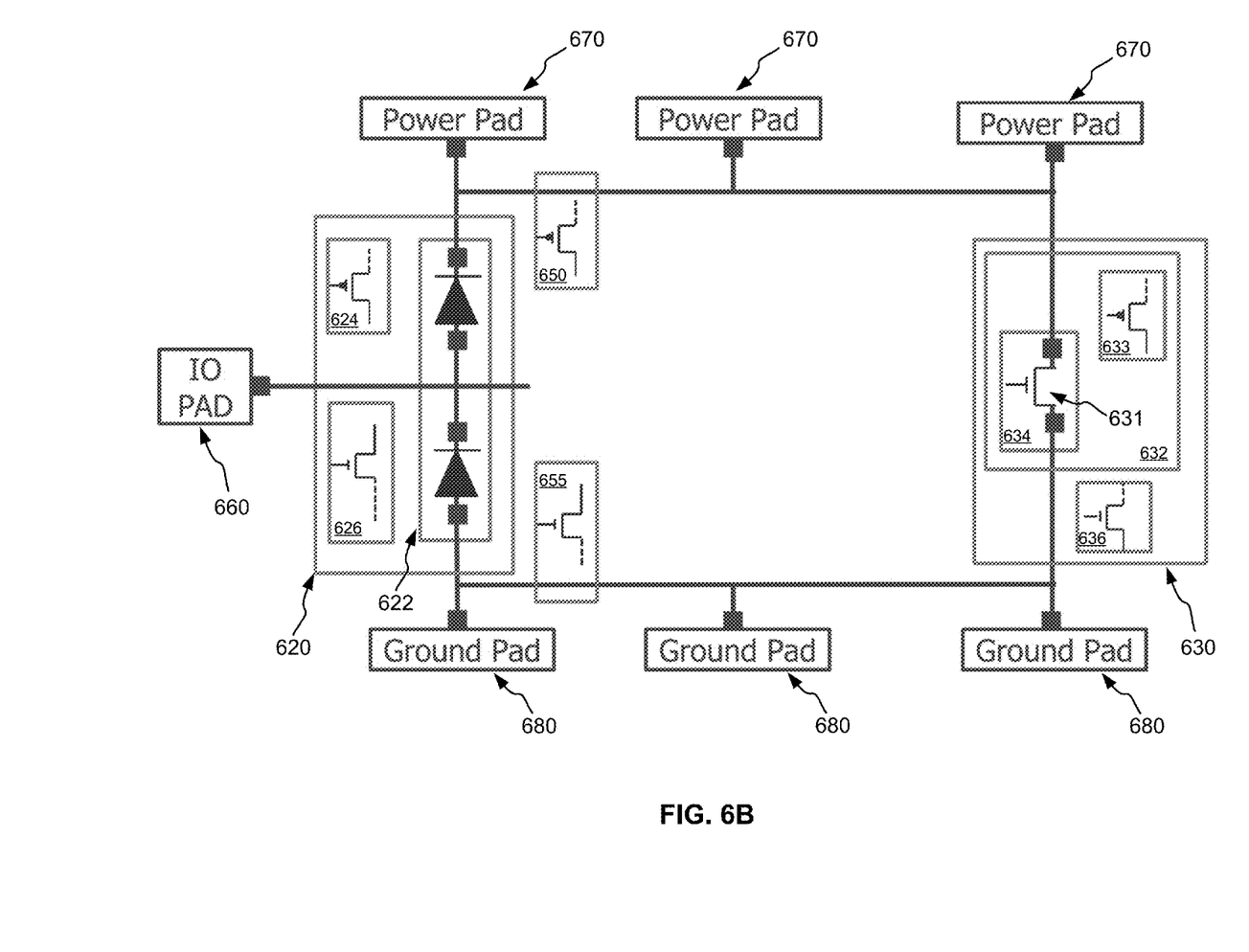
FIG. 6B illustrates an example of part of the circuit shown in FIG. 6A for which layout geometric elements are selected.

FIG. 6B represents circuit part for which layout geometric elements are selected. Layout geometric elements for part of the power net associated with the protected circuit (cell 610) and for part of the I/O net associated with the secondary ESD protection circuitry (cells 640 and 645) are not selected.

Optionally in operation 450, the design verification unit 390 performs a verification operation on the circuit design based on the selected layout geometric elements. For example, parasitic resistance may be extracted based on the selected layout geometric elements. The layout data reduction process described by the operations 410-450 greatly reduces the data that need to be analyzed by the verification operation. Moreover, the layout data reduction process can preserve the hierarchical data structure. Therefore, the verification can be executed in a much shorter time period. This is particular useful for verifies a large full-chip design.

CONCLUSION

While the disclosed technology has been described with respect to specific examples such as the ESD protection circuitry including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, executed by at least one processor of a computer, comprising:
    identifying a plurality of circuit elements represented in a circuit design model, wherein the circuit design model comprises netlist information and layout data, and the plurality of circuit elements comprises one or more electrostatic discharge (ESD) protection elements, one or more input/output (I/O) pads, one or more power supply pads, or any combination thereof;
    identifying pin-pairs corresponding to the plurality of circuit elements, wherein the pin-pairs comprise coupled pins;
    determining, based on the pin-pairs, one or more nets and one or more cells, wherein at least one of the one or more cells comprises at least a portion of one or more power supply grids on metal layers;
    selecting, based on the one or more nets and the one or more cells, one or more layout geometric elements in the circuit design model; and
    performing, based on the one or more layout geometric elements, a verification operation on the circuit design model.

2. The method recited in claim 1, wherein the netlist information comprises information extracted from the layout data.

3. The method recited in claim 1, wherein the selecting the one or more layout geometric elements comprises determining a connectivity model for the one or more layout geometric elements.

4. The method recited in claim 1, wherein the selecting the one or more layout geometric elements comprises maintaining a hierarchy of the one or more cells.

5. One or more non-transitory computer-readable media storing computer-executable instructions that, when executed by one or more processors, cause the one or more processors to:
    identify a plurality of circuit elements represented in a circuit design model, wherein the circuit design model comprises netlist information and layout data, and the plurality of circuit elements comprises one or more electrostatic discharge (ESD) protection elements, one or more input/output (I/O) pads, one or more power supply pads, or any combination thereof;
    identify pin-pairs corresponding to the plurality of circuit elements, wherein the pin-pairs comprise coupled pins;
    determine, based on the pin-pairs, one or more nets and one or more cells, wherein at least one of the one or more cells comprises at least a portion of one or more power supply grids;
    select, based on the one or more nets and the one or more cells, one or more layout geometric elements in the circuit design model; and
    perform, based on the one or more layout geometric elements, a verification operation on the circuit design model.

6. The one or more non-transitory computer-readable media recited in claim 5, wherein the netlist information comprises information extracted from the layout data.

7. The one or more non-transitory computer-readable media recited in claim 5, wherein the instructions that cause the one or more processors to select the one or more layout geometric elements comprise instructions that cause the one or more processors to determine a connectivity model for the one or more layout geometric elements.

8. The one or more non-transitory computer-readable media recited in claim 5, wherein the instructions that cause the one or more processors to select the one or more layout geometric elements comprise instructions that cause the one or more processors to maintain a hierarchy of the one or more cells.

9. A system, comprising:
    at least one processor; and
    at least one memory storing computer-executable instructions that, when executed by the at least one processor, cause the system to:
        identify a plurality of circuit elements represented in a circuit design model, wherein the circuit design model comprises netlist information and layout data, and the plurality of circuit elements comprises one or more electrostatic discharge (ESD) protection elements, one or more input/output (I/O) pads, one or more power supply pads, or any combination thereof;
        identify pin-pairs corresponding to the plurality of circuit elements, wherein the pin-pairs comprise coupled pins;
        determine, based on the pin-pairs, one or more nets and one or more cells, wherein at least one of the one or more cells comprises at least a portion of one or more power supply elements;
        select, based on the one or more nets and the one or more cells, one or more layout geometric elements in the circuit design model; and
        perform, based on the one or more layout geometric elements, a verification operation on the circuit design model.

10. The system recited in claim 9, wherein the netlist information comprises information extracted from the layout data.

11. The system recited in claim 9, wherein the instructions that cause the system to select the one or more layout geometric elements comprise instructions that cause the system to determine a connectivity model for the one or more layout geometric elements.

12. The system recited in claim 9, wherein instructions that cause the system to select the one or more layout geometric elements comprise instructions that cause the system to maintain a hierarchy of the one or more cells.

13. The method recited in claim 1, wherein the determining the one or more cells comprises identifying cells in a cone of influence of a device path from the pin-pairs.

14. The method recited in claim 1, wherein the selecting the layout geometric elements in the circuit design model comprises selecting a portion of cells described in the circuit design model.

15. The method recited in claim 14, wherein the performing the verification operation comprises performing the verification operation on the portion of cells.

16. The method recited in claim 1, wherein:
    the selecting the one or more layout geometric elements comprises generating a second circuit design model, the second circuit design model comprising a portion of the circuit design model; and the performing the verification operation comprises performing, using the second circuit design model, the verification operation.

17. The method recited in claim 1, wherein the verification operation comprises verification of electrostatic discharge (ESD) protection.

18. The one or more non-transitory computer-readable media recited in claim 5, wherein the verification operation comprises verification of electrostatic discharge (ESD) protection.

19. The system recited in claim 9, wherein the verification operation comprises verification of electrostatic discharge (ESD) protection.

* * * * *